Dec. 3, 1963 B. D. PARKER 3,113,294

BINARY DIGITAL DATA TRANSMISSION SYSTEMS

Filed July 31, 1959 3 Sheets-Sheet 1

Dec. 3, 1963 B. D. PARKER 3,113,294

BINARY DIGITAL DATA TRANSMISSION SYSTEMS

Filed July 31, 1959

3 Sheets-Sheet 3

United States Patent Office 3,113,294
Patented Dec. 3, 1963

3,113,294
BINARY DIGITAL DATA TRANSMISSION SYSTEMS
Bernhard Dollman Parker, London, England, assignor to Decca Limited, London, England, a British company
Filed July 31, 1959, Ser. No. 830,857
11 Claims. (Cl. 340—154)

This invention relates to the transmission of binary digital data in serial form.

If binary digital data in serial form is transmitted in a single channel, there may be difficulty in separating two successive 1's or two successive 0's. This is usually done by introducing a gap between successive digits but this is not satisfactory if the information is to be transmitted over a channel, such as a long range radio link, where gaps may inadvertently appear. In a radio link for example, gaps may occur due to ionospheric reflections which might be mistaken for gaps between digits or a digit may be repeated after a short time delay due to propagation over an indirect path. To overcome these difficulties it would be possible to use gaps between digits which are very much longer than would otherwise be required or the message time might be shortened by indicating a gap by the transmission of an identification signal but, in either case, the time required for the transmission of information is longer than would otherwise be necessary.

According to this invention, apparatus for the transmission of binary digital data in serial form comprises four transmission channels for the separate transmission of information, and means for separating and feeding the successive digits of incoming information into the four channels so that the odd digits, that is to say the first, third, fifth etc. digits, have 1's fed into the first channel and 0's fed into the second channel, while even digits 1's are fed into the third channel and even digit 0's into the fourth channel. By this arrangement successive similar digits are clearly differentiated since they are transmitted over separate channels. A gap always occurs between successive similar digits in one channel and during this gap there has to be a transmission of digital information over at least one or two other channels so clearly identifying the gaps between digits. By employing four channels in this manner, each unit of digital information may be tranmitted as a definite digital unit no matter whether it is a 1 or a 0 and no reliance is placed on the absence of transmission for conveying required information . Furthermore the system permits of a number of different checks being made to ensure that transmission is correct. Thus, for example, each transmission has to commence with a digit on either the first or second channel. Each digit unit transmitted on either of these two channels must be followed by transmission on either the third or fourth channel. Likewise each digit unit transmission on the third or fourth channel must be followed by a transmission on either the first or second channel. A particularly convenient method of checking the accuracy of information is by transmitting information in groups containing a predetermined number of units of digital information and by counting the units of information received at the receiving end using a counter for units in the first and second channels, which counter has to be re-set after counting each unit and is arranged to be re-set by the next digital unit in either the third or fourth channel. Likewise a similar counter may be used for counting the information in the third and fourth channels, this counter being re-set after each unit by the next digital unit of information in the first or second channel. It will be seen that by using such counters, any failure to receive a unit of digital information will result in each of the counters being one unit short, or if the outputs of the two counters are combined to give a count of the units of all four channels, there will be two units short. Such a counting system thus checks against any failure to receive any digit and also checks that information in either the first or second channel is followed by information in the third or fourth channel and vice versa. Such an overall simple check will in general be adequate, but it would readily be possible to apply further checks to the received information, for example to check against more than one digit being received simultaneously.

It will be particularly noted that by the use of four channels it is possible to transmit the information in a manner providing ready checking of the correctness of the information. Use of more than four channels would not give any substantial further advantage.

The aforementioned means for separating and feeding the digits into the four channels conveniently comprises means for separating the odd digits from the even digits, means for receiving the odd digits and responsive to the digital values of the odd digits for feeding the digital information to the first and second channels according to the digital values and means for receiving the even digits and responsive to the digital values of the even digits for feeding digital information to the third and fourth channels according to the digital values.

In each channel, digital information may be transmitted in a similar manner, for example each digit may be transmitted as a pulse. Conveniently the four channels may be constituted by four different tone frequency sub-carrier transmissio nsystems on a single main carrier. With this latter arrangement odd 1's and 0's would be transmitted as pulses on first and second sub-carriers respectively while even 1's and 0's would be transmitted as pulses on third and fourth sub-carriers respectively.

The digital data transmission system described above is particularly suitable for transmission of digital data over long range radio links, as may be required, for example in transmitting positional or other information from aircraft on trans-oceanic and like flights. As one example of the use of the system, it may be employed in conjunction with the radio navigational system known as "Dectra" which is a phase comparison system providing positional information with respect to co-ordinate lines, the positional information being obtained by phase comparison of signals received from fixed ground stations. Each of the phase comparators in this system can be arranged to operate a mechanical phase responsive member which drives a plurality of digit discs geared in suitable ratios so that the digital information represented by the position of the discs corresponds to the phase measurement made on the aircraft. Preferably in such an arrangement a syncopic code (that is to say a binary digital code in which only one binary digit changes for each successive change in the Arabic decimal digit), such as for example a Gray code, is employed. The digital information corresponding to the required phase indications may then be fed to a serialiser for feeding the information into a four channel radio tranmission system. Pre-set digital coding devices may be provided for giving further information such as, for example, the identity of the aircraft and manually or automatically set coding devices may be provided for giving information such as, for example, the height of the aircraft. At a ground station, staticizers may be employed for converting the serial digit information back into parallel form, thus ready for processing. The information may then, for example, be recorded on a tape.

The following is a description of one embodiment of the invention, reference being made to the accompanying drawings in which.

The drawings illustrate apparatus for the transmission from an aircraft to a ground station of data in digital from relating to the position of the aircraft. The apparatus may very conveniently be used in conjunction with radio position fixing equipment which automatically determines the position of the aircraft and provides output information in digital form representative of the determined position. As one example, it may conveniently be used in conjunction with the radio navigation system known as "Dectra" which is a phase comparison system providing positional information with respect to co-ordinate lines, the positional information being obtained by phase comparison of signals received from fixed ground stations. Each of the phase comparators in the aircraft can be arranged to operate a mechanical phase indicator and also to drive a plurality of digit discs geared in suitable ratios so that the digital information represented by the position of the discs corresponds to the phase measurements made on the aircraft. A binary digital code in which only one binary digit changes for each successive change in the Arabic decimal digit, such as for example the Gray code, is employed.

Figure 1:
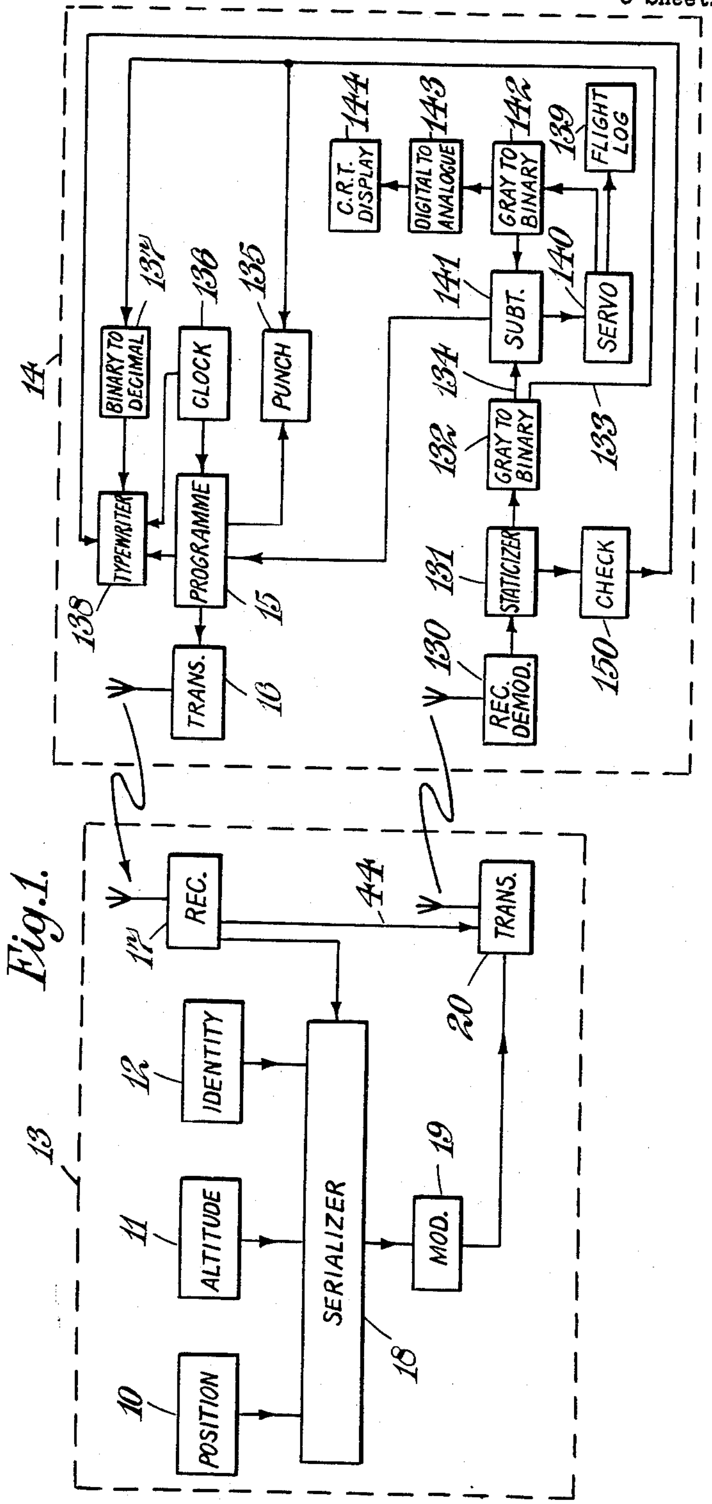
FIGURE 1 is a block diagram illustrating a system for transmitting positional information from a aircraft to a ground station.

Referring to FIGURE 1 of the drawings, apparatus providing digital information representative of the position of the aircraft is indicated diagrammatically at 10. It will generally also be desired to transmit further information, for example the altitude and the identity of the aircraft. For this purpose, there are provided further units 11, 12 giving outputs representing this information in digital form. The altitude may be obtained from an altimeter and the unit 11 may be directly driven by the altimeter. In some cases however it may be sufficient merely to set the altitude information into the equipment manually, in which case the unit 11 would comprise a series of switches for providing a digital output representative of the altitude corresponding to the setting of the switches. Likewise the identity unit 12 may comprise merely a series of switches providing the necessary output in a digital code.

The airborne equipment in FIGURE 1 is indicated as being included within the dashed line 13 while the ground equipment is shown within the dashed line 14. The apparatus is arranged so that one ground station may co-operate with a large number of aircraft but for simplicity only one set of aircraft equipment is shown in the drawing. To enable the ground equipment to co-operate with a number of aircraft, there is provided an interrogation system comprising a programme unit 15 and transmitter 16 at the ground station for transmitting interrogation signals to a receiver 17 on the aircraft which responds only to a particular interrogation signal. Different interrogation signals are used for each aircraft and this interrogation equipment constitutes a selective calling system arranged in the known manner to call each of a number aircraft in turn according to a programme predetermined by the programme unit. The coded interrogation signals from the transmitter are picked up by the receiver 17 on the aircraft and the receiver includes a de-coding unit to provide an output pulse only when the particular code interrogation signal for that aircraft is received. Normally the programme unit 15 would be arranged to interrogate all the aircraft in turn but provision may be made for more frequent interrogation of selected aircraft under manual control or other means if information about the position of that aircraft is required immediately.

Figure 2:
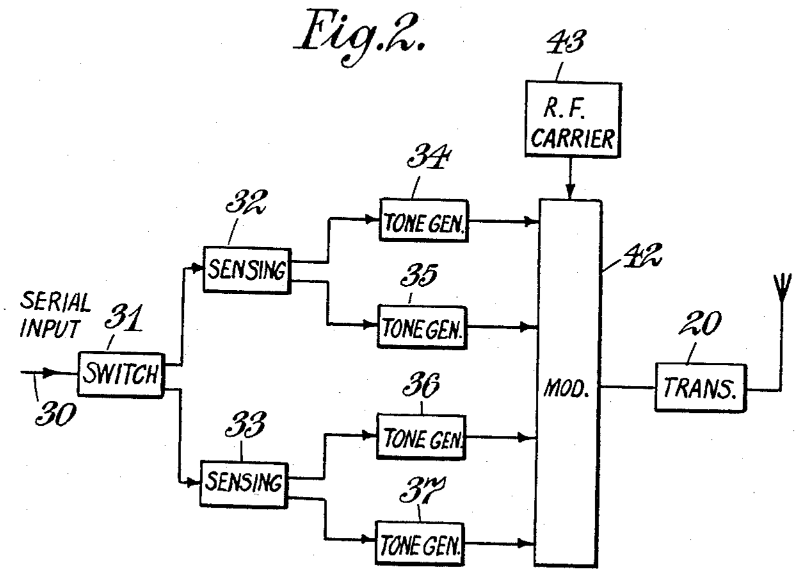
FIGURE 2 is a block diagram illustrating in further detail part of the aircraft equipment used in the apparatus of FIGURE 1.

The digital data in the units 10, 11 and 12 is fed into a serialiser 18 which will be described in further detail later with reference to FIGURE 3 and which operates, when the appropriate interrogation signal is received by the receiver 17, to feed out the digital information in serial form to a modulator unit 19 which modulates a transmitter 20 for transmitting this information to a ground station. The modulator unit and transmitter are illustrated in further detail in FIGURE 2, and referring to that figure, the digital information in serial form in the input circuit 30 is fed to a switch 31 which operates to feed alternate units of the digital information as short duration pulses to two sensing units 32, 33 so that odd digits (i.e. the first, third, fifth etc.) in the serial input are fed to the sensing unit 32, while even digits (i.e. the second, fourth etc.) are fed to the sensing unit 33. The sensing units 32, 33 are responsive to the digital values of the input digits and the sensing unit 32 feeds 0's as pulses to modulate a tone generator 34 and feeds 1's as pulses to modulate a tone generator 35. Likewise the sensing unit 33 feeds 0's as pulses to modulate a tone generator 36 and 1's as pulses to modulate a tone generator 37. The four tone generator units 34 to 37 provide respectively four different frequency modulated sub-carriers. The four modulated sub-carriers are then applied to a main modulator 42 modulating a radio frequency carrier from a carrier source 43 to provide a modulated output signal for feeding to the transmitter 20. As will be described later, this transmitter 20 is switched on only when the appropriate interrogating signal has been received by the receiver 17 and a switch control circuit 44 is shown diagrammatically for this purpose in FIGURE 1. As also will be explained later, the transmitter is switched off automatically at the end of the transmission of each set of digital data from the aircraft.

Figure 3:
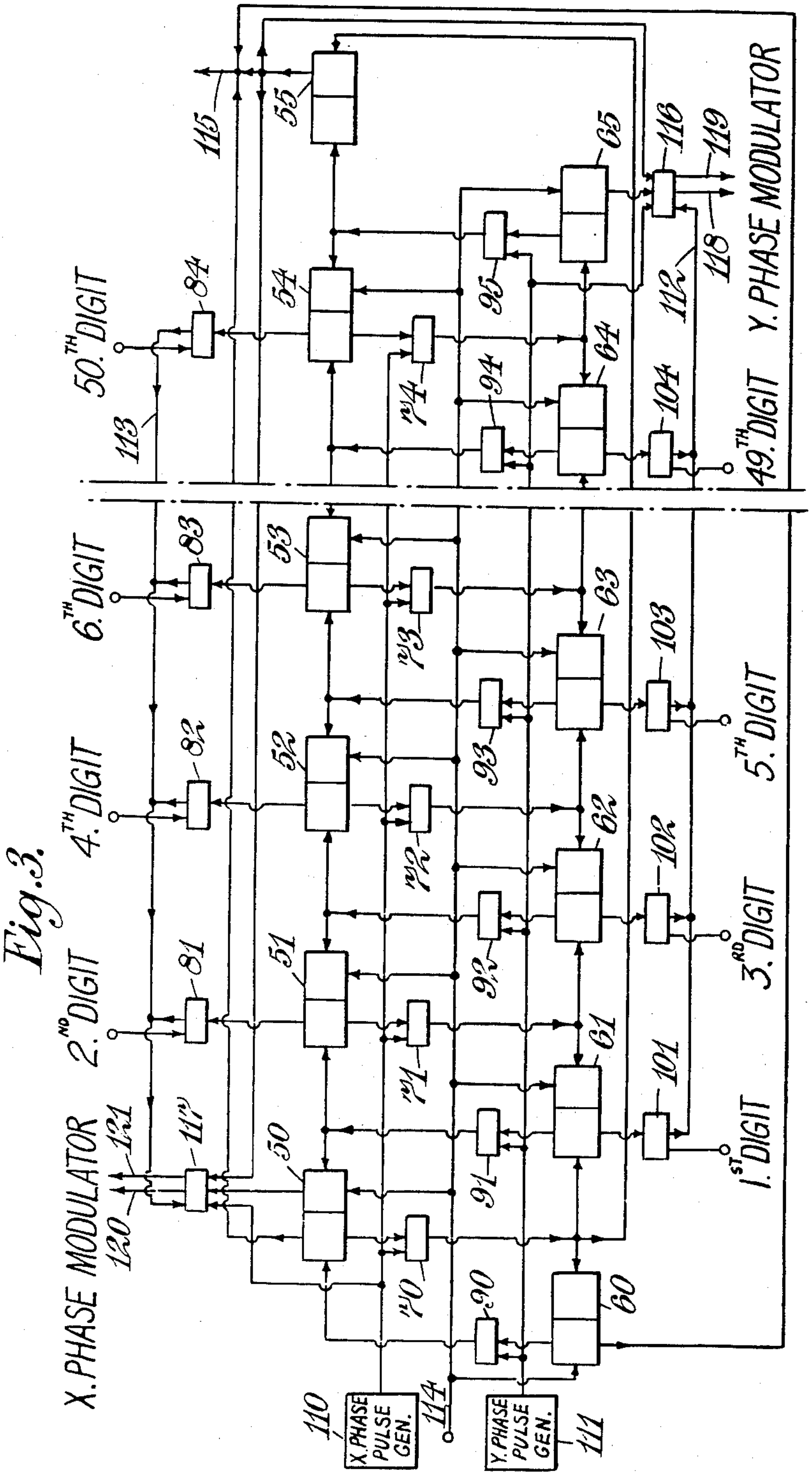
FIGURE 3 is a diagram illustrating another part of the aircraft equipment.

The serializer 18 is illustrated in further detail in FIGURE 3 and comprises two series of bi-stable devices 50, 51, 52, 53, 54, 55 and 60, 61, 62, 63, 64 and 65 associated respectively with even and odd digits. As will be seen from the drawings, if 50 digits are to be transmitted, there would require to be 27 such units in each of these series of bi-stable devices. Associated with the bi-stable devices 50 to 54 are "and" gates 70 to 74 and associated also with bi-stable devices 51 to 54 are "and" gates 81 to 84. Associated with the bi-stable devices 60 to 65 are "and" gates 90 to 95 and associated with the bi-stable devices 61 to 64 are "and" gates 101 to 104. The arrangement of FIGURE 3 is generally similar to the logical control register described in the specification of co-pending application No. 808,257, filed April 22, 1959, now Patent No. 3,041,476, and reference may be made to that specification for further explanation of the operation of such a circuit. The gate circuits 70 to 74 and 90 to 95 are opened alternately by pulses from two pulse generators 110, 111 which produce pulses alternately. Conveniently the pulses from the generators 110 and 111 will be referred to as the X phase and Y phase pulses respectively. The bi-stable devices 50–55 and 60–65 have two states which will be referred to as the "on" and "off" states. The gate circuits 70–74 and 90–95 are arranged so that each gate when open, if the associated bi-stable device is in the "on" condition, will set the next bi-stable device to that condition and re-set the preceding bi-stable device to the "off" condition. Thus the bi-stable devices can be set to the "on" condition alternately, the device 60 being set first, then the device 50, then 61, then 51 and so on. The device 60 is re-set to the "off" condition when device 61 is set to the "on" condition and so on. The digital information is applied as a signal for a 1 and no signal for a 0 with the odd digits being applied to the "and" gates 101 to 104 and the even digits to the "and" gates 81 to 84. Thus when the associated bi-stable device is set, if a 1 is present on the digit input lead to the associated "and" gate 81 to 84 or 101 to 104, an output would be obtained from that gate. The outputs for the odd digits are fed onto the lead 112 and the outputs for even digits onto the lead 113. The serializer unit is set in operation by the appropriate incoming interrogation signal, the receiver 17 of FIGURE 1 providing a pulse which is applied to an input lead 114 of FIGURE 3. This interrogation pulse re-sets all the bi-stable devices to the "off" condition except device 60 which is set to the "on" condition and device 55 which will be referred to later. The switching of the bi-stable device 60 to the "on" condition causes gate 90 to pass a signal when the next Y phase pulse is obtained from the Y phase pulse generator 111. This signal from the gate 90 operates the bi-stable device 50 which is set to the "on" condition and which therefore, at the next X phase pulse from the pulse generator 110 will pass a pulse through the gate 70 to re-set the bi-stable device 60 to the "off" condition and to set the bi-stable device 61 to the "on" condition and to set the bi-stable device 55 to the "off" condition. This setting of the bi-stable device, 55 to the "off" condition provides a signal on lead 115 for switching the transmitter on. It will be seen that the various bi-stable devices 61, 51, 62, 52 etc. are then operated in sequence and hence the digital information on the digit input leads to gates 101, 81, 102, 82 etc. is applied in sequence alternately to the leads 112 and 113 thence to gate units 116 and 117 respectively. Provided the transmitter is on, as determined by the setting of the bi-stable device 55, the gate units 116 and 117 will be opened by Y and X phase pulses respectively to pass appropriate output signal pulses onto leads 118, 119 and 120, 121 respectively for feeding the sensing units units 32 and 33. The sensing units 32, 33 may each comprise a pair of amplifiers, one inverting the signal (i.e. changing 1's to 0's and vice versa) and the other not inverting the signal and the output pulses from one amplifier would be fed to one tone generator and from the other amplifier to another tone generator so that the appropriate two tone generators are modulated according to the value of the digit. After the final digit has been transmitted on setting bi-stable device 54 to the "on" condition, the next bi-stable device 65 operates in sequence to switch the bi-stable device 55 to the "on" condition so providing the signal for switching off the transmitter. It will thus be seen that the serializer of FIGURE 3 serves to feed digit information in serial form to the tone generators and also performs the function of switch 31 of FIGURE 2 to feed odd digits to one output and even digits to a second output.

The airborne unit transmits the digital information on a carrier having four different tone sub-carriers each of which carries pulse modulation. The first and second sub-carriers carry information representing respectively the two different possible values of the odd digits and the third and fourth sub-carriers carry information representing respectively the two different possible values of the even digits. The information is transmitted as short duration pulses with intervals between the pulses as the digits are transmitted successively on different sub-carriers. The various pulses on the different tone sub-carriers will occur in sequence and at the ground station, these signals are received by a receiver and demodulating unit 130 which receives and demodulates the four sub-carriers to provide output pulses in sequence which are fed to a staticizer 131, which may conveniently be a register of the kind described in the aforementioned application No. 808,257. The output from the staticizer 131, assuming a Gray code has been employed, is converted by a converter 132 into a binary digital code. This converter 132 has two output circuits 133 and 134 in the particular embodiment illustrated in FIGURE 1. The output circuit 133 feeds a punch unit 135 for recording the binary digital data as punched holes on a tape. A clock 136 is provided for recording also the clock time of each set of digital information on the punch tape, the punch being synchronized from the aforementioned program unit 15 so that the various sets of digital information may be correlated with the programmed interrogation sequence. The output circuit 133 also feeds a binary to decimal converter 137 for converting the information into decimal form for operating an automatic typewriter 138 to record this information. The output from the clock 136 is also fed to the typewriter 138 so that the clock time is also recorded.

The output circuit 134 from the Gray to binary converter 132 is used to provide automatic chart display of the position of a selected aircraft. It will be appreciated that the punch tape punched by the unit 135 and the typewriter 138 will record information about all the various aircraft which are interrogated. Any selected aircraft may be tracked, however, with its track being recorded on a flight log 139, which flight log has a chart movable in one direction and a recording stylus movable in a transverse direction as, for example, in the automatic chart display apparatus described in British Patent No. 665,135, filed February 28, 1949 and published on January 16, 1952, which British Patent describes a servo-operated apparatus for recording automatically on a chart gradually changing positional information of a radio navigational system. The flight log 139 is operated by a servo unit 140 which, in a typical construction, comprises two motors, one for driving the chart in one direction and the second for driving the stylus in a transverse direction. These two servo motors are controlled by a subtracting unit 141 which subtracts the output from the Gray to binary converter 132 on the circuit 134 from corresponding digital information obtained from digit discs driven by the servo motors 140, which information is converted into binary code by a Gray to binary converter 142. The subtracting unit provides two output signals representative of the signs of the differences for the two co-ordinates of position of the aircraft and controls the two servo motors 140 accordingly. It will thus be seen that the units 140, 141 and 142 constitute a closed loop servo mechanism serving to control the two servo motors to maintain digit discs driven by the servo motors at positions corresponding to the digital input at lead 134. These servo motors directly drive the flight log 139. To ensure that the next interrogation does not commence until the operation of the servo loop for the flight log has been completed, the subtracting unit 141 feeds a signal back into the programme unit 15 at the end of the subtraction operation. The binary digital information from the converter 142 is also converted into analogue form in a converter 143 for application to a cathode ray tube display 144. It will be seen that the flight log 139 will serve to provide a permanent record on a chart of the track of a distant aircraft. Such flight log could be used if only one aircraft was to be tracked. The cathode ray tube display 144 may be used, however for displaying the position of a number of different aircraft, the cathode ray beam being switched in sequence in accordance with the interrogation programme on the programme unit 15 so that the successive positions taken up by the cathode ray beam show in sequence the positions of the various aircraft.

The transmission of the digital information on four channels enables checking to be effected at the ground station of the correct receipt of information. In this information transmission system a gap must always occur between successive similar digits in one channel and during this gap there has to be a transmission of digital information over at least one of two other channels. Each signal is transmitted as a pulse, no matter whether it is a 1 or a 0 and no reliance is placed on the absence of transmission for conveying information.

Figure 4:
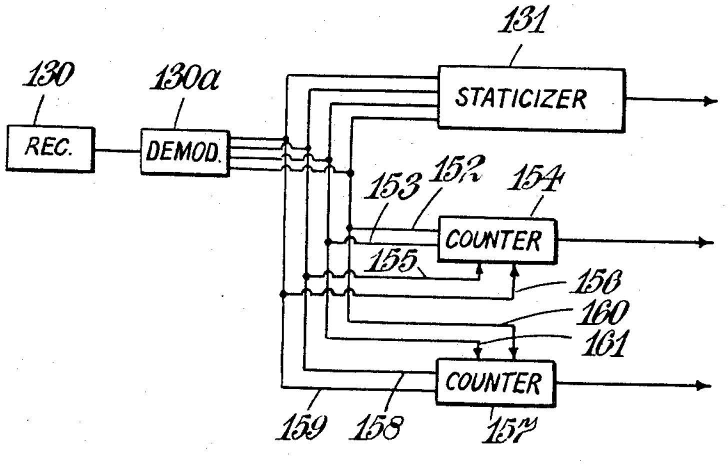
FIGURE 4 is a diagram illustrating part of the ground equipment.

Referring to FIGURE 1 there is illustrated diagrammatically a checking unit 150 fed from the staticizer 131, which checking unit feeds the typewritten information if the checking unit is not satisfied. One form of checking unit is illustrated in FIGURE 4 which figure shows the receiver 130 with a separate demodulator 130a feeding four outputs to the staticizer 131. The output pulses corresponding to the first and second channels, i.e. the odd digits are fed together on leads 152, 153 to a counter 154 which counter has, after each digit, to be re-set before it can count the next digit. The resetting signal is provided on leads 155, 156 by the digits in the third and fourth channels. It will thus be seen that if the information is transmitted in groups of 50 digits, the counter 154 will count twenty-five odd digits only if every odd digit is received and if an even digit is received between each odd digit. This checking thus provides a very high degree of protection against spurious pulses which might arise in the radio link and against any momentary or prolonged failure to receive signals. It also provides protection against errors due to a single pulse being received two or more times in rapid succession due to transmission over different length paths. A similar counter 157 counts the even digits on leads 158, 159 and is re-set by the odd digits on leads 160, 161. The outputs from the two counters may be combined if desired to operate the fault symbol on the typewriter 138. The two counters are conveniently together constituted by a control register of the kind described in the aforementioned application No. 808,257, comprising a series of bi-stable devices, the $n$th device being set to one condition simultaneously with the re-setting of the $(n-2)^{th}$ device to the datum condition and is re-set to the datum condition simultaneously with the setting of the $(n+2)^{th}$ device. The received signals from the modulator 130a may be used for the successive operation of the bi-stable devices.

Any failure to receive a unit of digital information will result in each of the counters being one short so that if the outputs of the two counters are combined, the overall output will be two short. If the two counters are together constituted by a control register as described above, the checking system also serves to ensure that the count starts with an odd digit. The counting inherently ensures that each odd digit is followed by an even digit and vice versa. Such a simple overall check will in general be adequate but it would readily be possible to provide further checking if necessary, for example to check against more than one digit being received simultaneously.

It will be seen that by the use of four channels it is possible to transmit the information in a manner providing ready checking of the correctness of the information. Use of more than four channels would not give any substantial further advantage.

I claim:

1. Apparatus for the transmission of binary digital data in serial form comprising four transmission channels for the separate transmission of information, channel selector means responsive to incoming digits for separating and feeding the successive digits of incoming information into the four channels so that the odd digits have 0's fed into the first channel and 1's fed into the second channel, while even digit 0's are fed into the third channel and even digit 1's into the fourth channel, and transmission means for transmitting the information in said four channels.

2. Apparatus as claimed in claim 1 wherein digital information is transmitted in a similar manner in each channel.

3. Apparatus as claimed in claim 2 wherein each digit is transmitted as a pulse in the appropriate channel.

4. Apparatus as claimed in claim 1 wherein said transmision means for transmitting the information in said four channels is constituted by four different tone frequency sub-carrier transmission systems on a single main carrier.

5. Apparatus for the transmission of data as claimed in claim 1 in combination with receiving apparatus for receiving the information transmitted over the four channels and a staticizer for converting the serially received digital information into parallel form.

6. The combination as claimed in claim 5 wherein the information to be transmitted is arranged in groups containing a predetermined number of digits and wherein checking means are provided for checking the signals received by said receiving apparatus, which checking means include a counter responsive to signals received on both the first and second channels, which counter is arranged so that it has to be re-set by a signal on either the third or fourth channel after counting each unit.

7. The combination as claimed in claim 6 wherein a further counter is provided responsive to signals on both the third and fourth channels, which counter is arranged so that it has to be re-set by a signal on either the first or second channel after counting each unit.

8. Apparatus as claimed in claim 1 and arranged for the transmission of positional information from an aircraft to a ground station, wherein said ground station includes means for converting the transmitted positional information in digital form into control signals for controlling automatically positional display apparatus.

9. Apparatus for the transmision of binary digital data in serial form comprising first, second, third and fourth transmission channels for the separate transmission of data, means for separating the odd digits and the even digits from the successive digits of incoming information, means for receiving the separated odd digits and responsive to the digital values of the odd digits for feeding digital information as pulses to the first or to the second channel according to the digital value so that odd digit 0's are fed as pulses to the first channel and odd digit 1's are fed as pulses to the second channel, means for receiving the separated even digits and responsive to the digital values of the even digits for feeding digital information as pulses to the third and fourth channels so that even digit 0's are fed as pulses to the third channel and even digit 1's are fed as pulses to the fourth channel, and transmission means for transmitting the information in said four channels.

10. A data transmission link system for transmitting binary digital data in serial form from a transmitting station to a receiving station, said link system comprising first, second, third and fourth pulse transmission channels from the transmitting station to the receiving station, and, at the transmitting station, means for separating the odd digits and the even digits from the successive digits of incoming information, means for receiving the separated odd digits and responsive to the digital values of the odd digits for feeding digital information as pulses to the first or to the second channel according to the digital value so that odd digit 0's are fed as pulses to the first channel and odd digit 1's are fed as pulses to the second channel, and means for receiving the separated even digits and responsive to the digital values of the even digits for feeding digital information as pulses to the third and fourth channels so that even digit 0's are fed as pulses to the third channel and even digit 1's are fed as pulses to the fourth channel, and, at the receiving station, receiving apparatus for receiving the information transmitted over the four channels and a staticizer fed with the pulse signals from said receiving apparatus for converting the serially received digital information into parallel form.

11. A data transmision link system as claimed in claim 10 wherein checking apparatus is provided at the receiving station comprising a pulse counter and circuit means arranged to render said counter responsive only to a signal from the third or fourth channel after a pulse from the first or second channel has been counted and responsive only to a signal from the first or second channel after a pulse from the third or fourth channel has been counted.

(References on following page)

References Cited in the file of this patent

UNITED STATES PATENTS

| | | |
|---|---|---|
| 1,661,004 | Mills | Feb. 28, 1928 |
| 2,048,081 | Riggs | July 21, 1936 |
| 2,640,188 | Kienast | May 26, 1953 |
| 2,651,718 | Levy | Sept. 8, 1953 |
| 2,677,119 | Luck | Apr. 27, 1954 |
| 2,701,276 | Pletscher | Feb. 1, 1955 |
| 2,717,370 | Piper | Sept. 6, 1955 |
| 2,736,007 | Kenyon | Feb. 21, 1956 |
| 2,796,602 | Hess et al. | June 18, 1957 |
| 2,801,334 | Clapper | July 30, 1957 |